US012794701B2

(12) United States Patent
Ureche et al.

(10) Patent No.: US 12,794,701 B2
(45) **Date of Patent: *Nov. 10, 2026**

(54) DATA RECOVERY FOR A COMPUTING DEVICE

(71) Applicant: Google LLC, Mountain View, CA (US)

(72) Inventors: Tony Ureche, Bellevue, WA (US); Roy D'Souza, Mountain View, CA (US); Stefan Kölbl, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 416 days.

This patent is subject to a terminal disclaimer.

(21) Appl. No.: 18/320,510

(22) Filed: May 19, 2023

(65) Prior Publication Data

US 2023/0291565 A1 Sep. 14, 2023

Related U.S. Application Data

(63) Continuation of application No. 17/444,884, filed on Aug. 11, 2021, now Pat. No. 11,689,369.

(51) Int. Cl.
*H04L 9/32* (2006.01)
*H04L 9/08* (2006.01)

(52) U.S. Cl.
CPC .......... *H04L 9/3234* (2013.01); *H04L 9/0822* (2013.01); *H04L 9/0825* (2013.01); *H04L 9/085* (2013.01); *H04L 9/0877* (2013.01)

(58) Field of Classification Search
CPC ... H04L 9/3234; H04L 9/0822; H04L 9/0825; H04L 9/085; H04L 9/0877; H04L 9/32; H04L 9/08
See application file for complete search history.

(56) References Cited

U.S. PATENT DOCUMENTS

2002/0019935 A1 2/2002 Andrew et al.
2005/0193198 A1 9/2005 Livowsky
(Continued)

FOREIGN PATENT DOCUMENTS

JP S63151238 A 6/1988
JP 2009098889 A 5/2009

OTHER PUBLICATIONS

Notice of Allowance for Japanese Application No. 2024-508484 (with English translation), mailed Jan. 28, 2025, 6 pages.
(Continued)

*Primary Examiner* — Quazi Farooqui
(74) *Attorney, Agent, or Firm* — Brake Hughes Bellermann LLP

(57) ABSTRACT

According to an aspect, a method for accessing a computing device includes receiving, by the computing device, an authentication credential for recovery access to the computing device, the authentication credential being different from an authentication credential used to access encrypted data on the computing device, obtaining, in response to receipt of the authentication credential for recovery access, a first key portion stored on the computing device, transmitting, over a network, a request to receive a second key portion, receiving, over the network, a response that includes the second key portion, recovering a decryption key using the first key portion and the second key portion, and decrypting the encrypted data on the computing device using the decryption key.

20 Claims, 8 Drawing Sheets

(56) References Cited

U.S. PATENT DOCUMENTS

| | | | |
|---|---|---|---|
| 2016/0132699 | A1 | 5/2016 | Miller et al. |
| 2018/0204014 | A1 | 7/2018 | Thomas et al. |
| 2021/0184852 | A1* | 6/2021 | Feinberg ............... H04L 9/3213 |
| 2021/0334356 | A1* | 10/2021 | Li ......................... H04L 9/0894 |
| 2022/0070666 | A1 | 3/2022 | Hua et al. |

OTHER PUBLICATIONS

International Search Report and Written Opinion for PCT Application No. PCT/US2022/074627, mailed on Oct. 28, 2022, 14 pages.

"Guidelines for the Use and Management of Trusted Third Party Services", ISO/IEC JTC 1/SC 27 WD 14516; SC 27 WG 1 N873/SC27 N2002, Source: Maynard Hanscom, Project Editor, Project: JTC 1.27.19, Status: WD, Jun. 26, 1998, 40 pages.

* cited by examiner

DATA RECOVERY FOR A COMPUTING DEVICE

CROSS-REFERENCE TO RELATED APPLICATION

This application is a continuation of, and claims priority to, U.S. patent application Ser. No. 17/444,884, filed on Aug. 11, 2021, entitled "DATA RECOVERY FOR A COMPUTING DEVICE", the disclosure of which is incorporated by reference herein in its entirety.

BACKGROUND

Data associated with a computing device may be encrypted, and then decrypted when the user logs into their device. For example, a user may provide their password, and, in response to the user being authenticated, the data may be decrypted. Organizations that provide computing devices to users (e.g., schools, businesses) sometimes have policies for managing the device, including setting up the device with encrypted data. However, such an organization may require access to some of the encrypted data when the user may be unavailable or uncooperative. In addition, the user might have forgotten their password. In some examples, without the user's password, the decryption key for decrypting the encrypted data may not be recoverable.

SUMMARY

This disclosure relates to a recovery system that can securely provide access to encrypted data when an organization (or a person) that manages the computing device requires access to the encrypted data and the organization (or the person) is in possession of the computing device. In some examples, the recovery system can securely provide access to the encrypted data when the user does not have access to their password and the user is in possession of the computing device. The technical problem may include providing access to encrypted data on a computing device when an authentication credential to the encrypted data is unavailable in a manner that is secure and transparent. The recovery system discussed herein may provide a technical solution that maintains the security of the data associated with the computing device while providing access to the data when a user's authentication credential is not available in a manner that is resilient against network and physical attacks.

The recovery system may maintain two different key portions (e.g., a first key portion, a second key portion) in separate locations that are released to a decryption unit on the computing device if certain conditions are met, where the decryption unit requires both the first key portion and the second key portion to recover a decryption key that is used to decrypt the encrypted data. In contrast, some conventional recovery mechanisms may assign management of the decryption keys to a central entity, which may introduce technical problems such as risks of abuse, vulnerability to network attacks, and potentially vulnerability to mass surveillance that could place the privacy, security, and/or safety of users at risk.

The recovery system includes one or more server computers having a recovery service module. The recovery system includes a computing device configured to communicate with the recovery service module over a secure network. The computing device includes a crypto-processor configured to store and manage a key portion (e.g., a first key portion) associated with a user of the computing device. The first key portion may be a secret key (e.g., a cryptographic secret) that is stored inside the computing device (e.g., inside the crypto-processor). The computing device (e.g., the crypto-processor) may generate and store the first key portion (and the second key portion). In some examples, the computing device generates and stores the first key portion when a user account associated with the user is created and/or the user is enrolled with the recovery system. The crypto-processor may be a dedicated computer-on-a-chip or microprocessor for executing cryptographic operations. In some examples, the crypto-processor is a security chip or a trusted platform module.

As further described below, in the event that the user's authentication credential that is used to access the encrypted data is not available, the crypto-processor may communicate, over a network, with the recovery service module to obtain a second key portion, where the first key portion and the second key portion are used to recover a decryption key that is used to decrypt the encrypted data. Before the second key portion is returned to the crypto-processor, the recovery service module may cause a log entry to be recorded in a database (e.g., a public ledger), where the log entry may identify information about the access, such as a device identifier, information identifying the person that is granted access, and/or the time/date in which access was provided.

The recovery service module includes one or more hardware security modules that store and manage key portions associated with users of computing devices. For example, the hardware security module may store and manage a key portion (e.g., a second key portion) that is used (in combination with the first key portion) to recover a decryption key to decrypt the encrypted data on the computing device. The hardware security module may be a computing device (e.g., a physical computing device) that manages encryption keys and performs encryption and decryption functions and other cryptographic functions.

A user may provide their authentication credential to the computing device, which, when authenticated, may cause the crypto-processor to release the first key portion to the decryption unit on the computing device. The user's authentication credential may be a password associated with the computing device or a user account associated with the computing device. However, the authentication credential may include other forms of identifying information such as a digital certificate or biometrics data (e.g., facial scan, iris scan, fingerprint scan, audio data, etc.). In some examples, the decryption unit uses the first key portion (released by the crypto-processor) and the authentication credential to recover a decryption key to decrypt the encrypted data on the computing device. For example, the decryption key may be encrypted using an encryption key (e.g., a wrapping key). The decryption unit may use the first key portion and the authentication credential to obtain the encryption key, which is used to decrypt the decryption key.

In some examples, a third party may require access to some of the encrypted data on the computing device. For example, the third party may be associated with an organization that owns or manages the user's computing device. For example, the computing device may be an enterprise-owned computing device such as a work computer owned or managed by the user's company or a school computer owned or managed by the user's school. For one or more reasons (e.g., governance, risk management, legal, and/or compliance reasons), the organization may require access to the encrypted data on the computing device. However, without the user's authentication credential, according to some conventional techniques, the decryption unit will not be able to obtain or derive the decryption key.

To address this scenario, the organization may enroll the computing device in the recovery system so that one or more persons (e.g., authorized third parties) associated with the organization can access the user's computing device in the event that the user is unavailable, uncooperative, or is unable to provide the authentication credential (e.g., a forgotten password) and the third party has physical possession of the computing device. For example, the recovery system may store enrollment data associated with the user's computing device. The enrollment data may identify one or more people (or roles/types of people) within the organization that can access the user's encrypted data in the event that the user is unavailable or uncooperative or the authentication credential is otherwise unavailable. For example, the enrollment data may specify an authorized third party by identifying a user account that is authorized to gain entry to the user's encrypted data. The user account may be assigned to a particular person or a particular role in the organization (e.g., a manager, director, a human resources supervisor, etc.). The third party may use the user's computing device or another computing device to enroll in the recovery service. For example, the third party may use their computing device to communicate with the recovery service module (e.g., executable by a server computer) to enroll and submit the enrollment data, which is then communicated to the user's computing device by the recovery service module. In some examples, the third party may use the user's computing device to enroll and submit the enrollment data. In some examples, a computing device may render one or more user interfaces that permit the third party to enroll in the recovery service and enter one or more authorized third party user accounts.

The crypto-processor on the computing device may store the enrollment data. In some examples, the recovery service module (e.g., the hardware security module) on the server computer may store the enrollment data. In some examples, in response to the computing device being enrolled in the recovery system, the hardware security module may generate and store the second key portion. In some examples, the second key portion is encrypted and stored at the hardware security module.

To access the encrypted data on an enrolled computing device, the third party may provide their authentication credential to the computing device, which when authenticated, causes the crypto-processor to determine whether the authentication credential corresponds to (or matches) one of the authorized third party user accounts in the enrollment data stored on the crypto-processor. If the third party's authentication credential is one of the authorized third party user accounts, the crypto-processor may release the first key portion (stored on the computing device) to the decryption unit. Also, if the third party's authentication credential is one of the authorized third party user accounts, the crypto-processor is configured to communicate with the hardware security module that is part of the recovery service module of the server computer associated with the authorized third party to obtain the second key portion stored at the hardware security module. For example, the crypto-processor may transmit, over a network, a key request to the hardware security module, where the key request includes identification information about the third party, identification information about the user, and/or a device identifier associated with the computing device.

Before the second key portion is retrieved and returned to the crypto-processor, a log entry is made in a database to record the access to the computing device. The database may be a database that is publicly available. The database may be a database that is accessible by certain portions of the public. In some examples, the database is a public ledger. For example, the recovery service module includes a database recorder configured to record a log entry in the database. In some examples, the database may support tamper resistant logging, for example using a Merkle tree, hash list, or hash chain. Before the second key portion is transmitted to the computing device, the database recorder may communicate with the database over the network to record a log entry in the database. The log entry may include information about the access to the computing device. For example, the log entry may include the time, date, identification of the computing device, and/or identification of the person, role of the person, and/or the organization that has gained access to the computing device. After the log entry is made in the database, the hardware security module transmits the second key portion to the crypto-processor. The crypto-processor provides the second key portion to the decryption unit. The decryption unit uses the first key portion and the second key portion to recover the decryption key that is used to decrypt the encrypted data. In some examples, the first key portion and the second key portion are combined (e.g., to form a symmetric wrapping key) to decrypt the decryption key, and the decryption key is used to decrypt the encrypted data. In some examples, the decryption key may have been encrypted using the combination of the first key portion and the second key portion when the device was enrolled in the recovery process.

In some examples, the recovery system can securely provide access to the encrypted user data when the user has changed their password on another device (or using a browser) and the user does not have access to their password and the user is in possession of the computing device. In one example, the user may provide their authentication credential to the computing device, and when authenticated, the crypto-processor receives the authentication credential. The user may be authenticated in other ways (e.g., using an old password, recovery methods such as email or phone verification). Since the authentication credential is not the current authentication credential (that is combined with the first key portion) to recover the decryption key, the crypto-processor may communicate with the hardware security module to obtain the second key portion (in the same manner as described above), where the second key portion is released to the crypto-processor after the log entry is made in the database.

According to an aspect, a method for accessing a computing device includes receiving, by the computing device, an authentication credential for recovery access to the computing device, the authentication credential being different from an authentication credential used to access encrypted data on the computing device, obtaining, in response to receipt of the authentication credential for recovery access, a first key portion stored on the computing device, transmitting, over a network, a request to receive a second key portion, receiving, over the network, a response that includes the second key portion, recovering a decryption key using the first key portion and the second key portion, and decrypting the encrypted data on the computing device using the decryption key.

According to some aspects, the method may include one or more of the following features (or any combination thereof). The request to receive the second key portion initiates recording of a log entry into a database, wherein the second key portion is received at the computing device after recording of the log entry into the database. The method may include combining the first key portion and the second key portion to form a wrapping key and decrypting the decryption key using the wrapping key. The method may include obtaining enrollment data identifying at least one authorized user account, determining whether the authentication credential for recovery access corresponds to the at least one authorized user account, and transmitting, in response to the authentication credential for recovery access corresponding to the at least one authorized user account, the request to receive the second key portion. The first key portion is stored at a crypto-processor of the computing device, wherein the request to receive the second key portion is transmitted to a security module configured to store the second key portion. The method may include storing enrollment data on at least one of the crypto-processor or on the security module, the enrollment data identifying at least one authorized user account. The method may include receiving a successful authentication response in response to the authentication credential for recovery access being authenticated by an authentication system, wherein the first key portion is obtained in response to the successful authentication response. The authentication credential for recovery access may relate to a third party that owns or manages the computing device. The authentication credential for recovery access may relate to a user of the computing device.

According to an aspect, a recovery system includes a security module configured to receive, over a network, a first request from a computing device, the first request being for a second key portion configured to be combined with a first key portion stored on the computing device to recover a decryption key for decrypting encrypted data and a database recorder configured to transmit a second request to a database to record a log entry about the first request in the database. The security module is configured to transmit the second key portion to the computing device after the log entry is recorded in the database.

According to some aspects, the recovery system may include one or more of the following features (or any combination thereof). The security module is configured to store at least a portion of enrollment data, the enrollment data identifying at least one authorized user account associated with a third party. The security module is configured to generate the second key portion in response to receipt of the enrollment data. The security module is configured to generate the first key portion in response to receipt of the enrollment data, the security module is configured to transmit the first key portion to the computing device.

According to an aspect, a non-transitory computer-readable medium stores executable instructions that when executed by at least one processor cause the at least one processor to receive an authentication credential for recovery access to a computing device, the authentication credential being different from an authentication credential used to access encrypted data on the computing device, obtain, in response to receipt of the authentication credential for recovery access, a first key portion stored on the computing device, transmit, over a network, a request to receive a second key portion, the request to receive the second key portion initiating recording of a log entry into a database, receive a response that includes the second key portion after the log entry is recorded into the database, recover a decryption key using the first key portion and the second key portion, and decrypt the encrypted data using the decryption key.

According to some aspects, the non-transitory computer-readable medium may include one or more of the following features (or any combination thereof). The executable instructions include instructions that when executed by the at least one processor cause the at least one processor to encrypt data in response to receipt to a computing session being logged off. The executable instructions include instructions that when executed by the at least one processor cause the at least one processor to obtain enrollment data identifying at least one authorized user account, determine whether the authentication credential for recovery access corresponds to the at least one authorized user account, and transmit, in response to the authentication credential for recovery access corresponding to the at least one authorized user account, the request to receive the second key portion. The executable instructions include instructions that when executed by the at least one processor cause the at least one processor to store the enrollment data on at least one of a crypto-processor on the computing device or a security module executable by a server computer and generate at least one of the first key portion or the second key portion in response to receipt of the enrollment data. The executable instructions include instructions that when executed by the at least one processor cause the at least one processor to store the first key portion on the crypto-processor and store the second key portion on the security module. The executable instructions include instructions that when executed by the at least one processor cause the at least one processor to receive a successful authentication response in response to the authentication credential for recovery access being authenticated by an authentication system, wherein the first key portion is obtained from the computing device in response to the successful authentication response. The executable instructions include instructions that when executed by the at least one processor cause the at least one processor to combine the first key portion and the second key portion to form a symmetric wrapping key and decrypt the decryption key using the symmetric wrapping key.

The details of one or more implementations are set forth in the accompanying drawings and the description below. Other features will be apparent from the description and drawings, and from the claims.

DETAILED DESCRIPTION

Figure 1A:
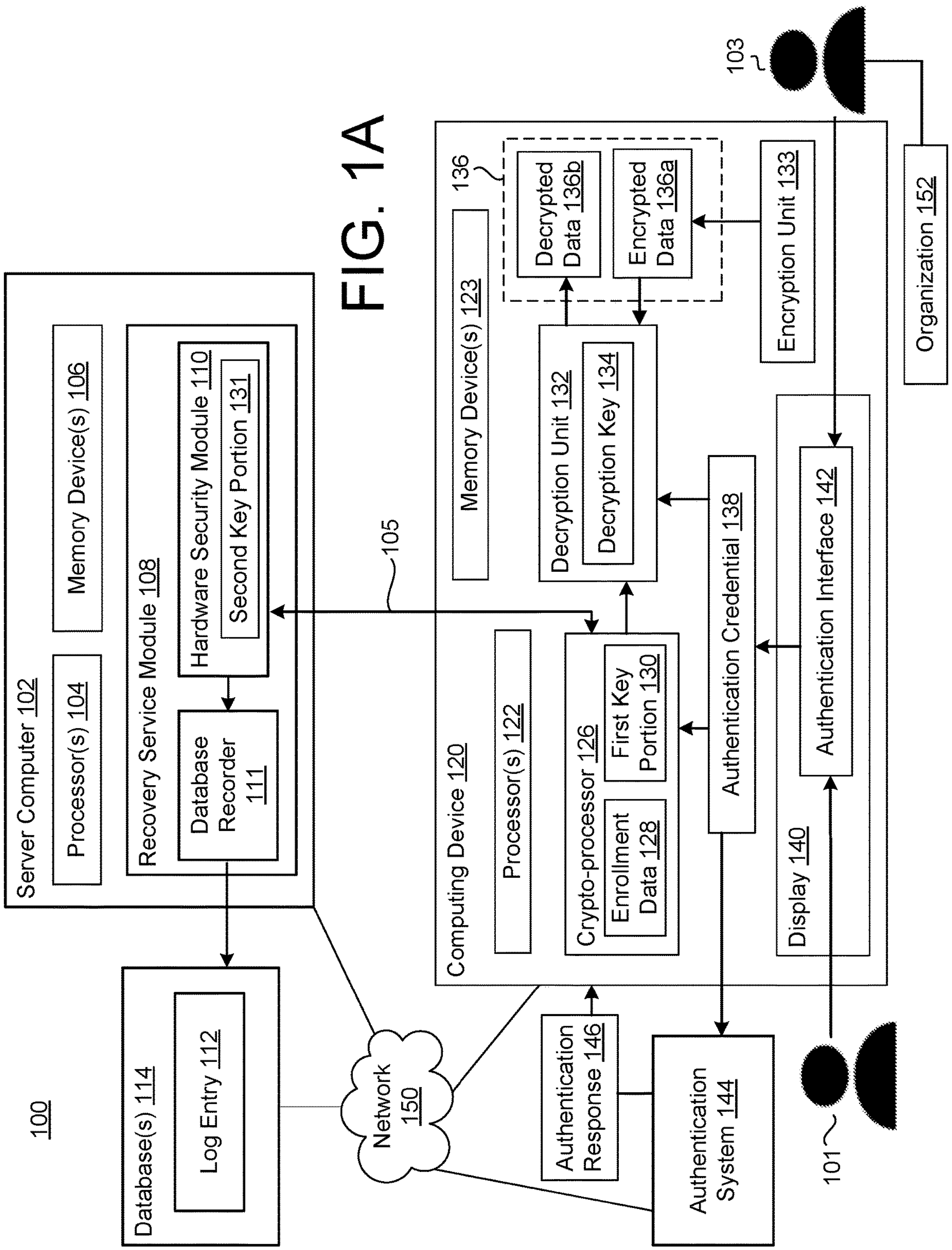
FIG. 1A illustrates a recovery system for recovering encrypted data on a computing device according to an aspect.
Figure 1B:
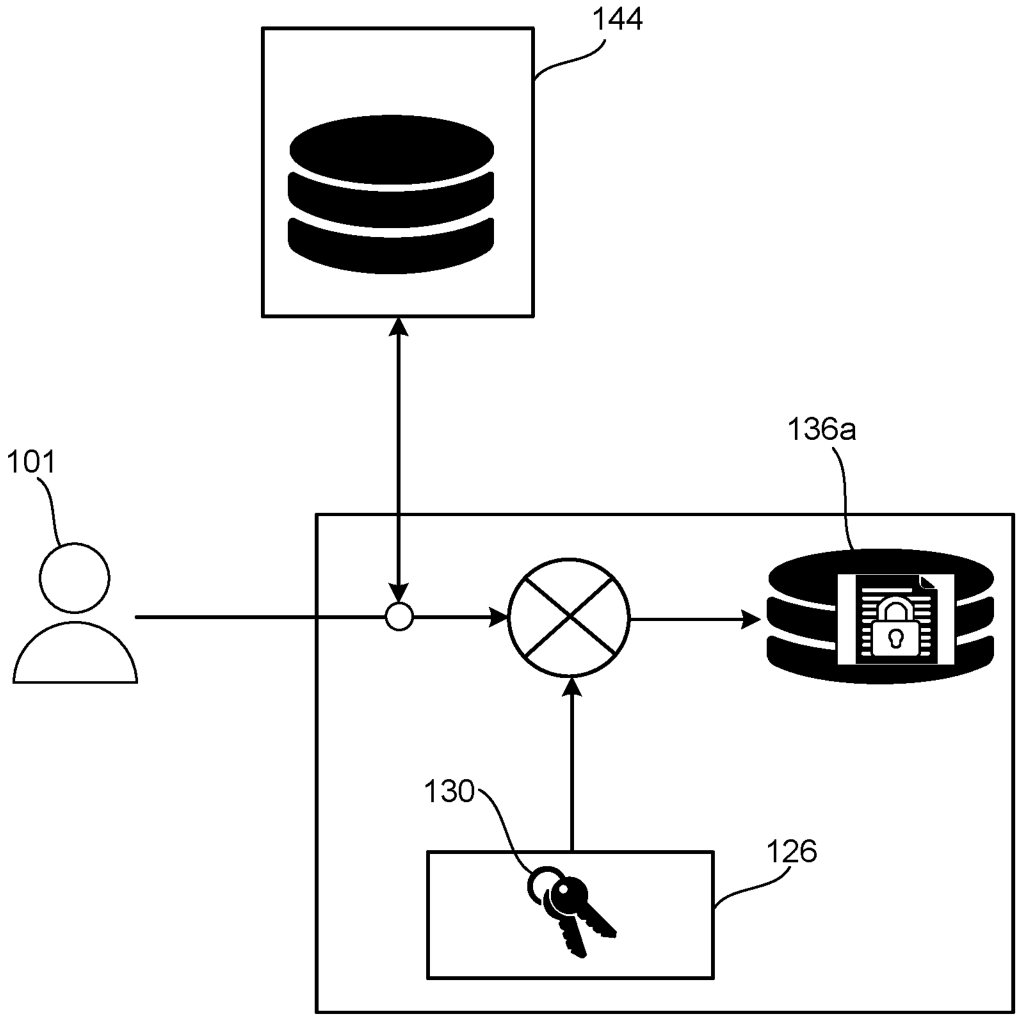
FIG. 1B illustrates a login workflow for a computing device according to an aspect.
Figure 1C:
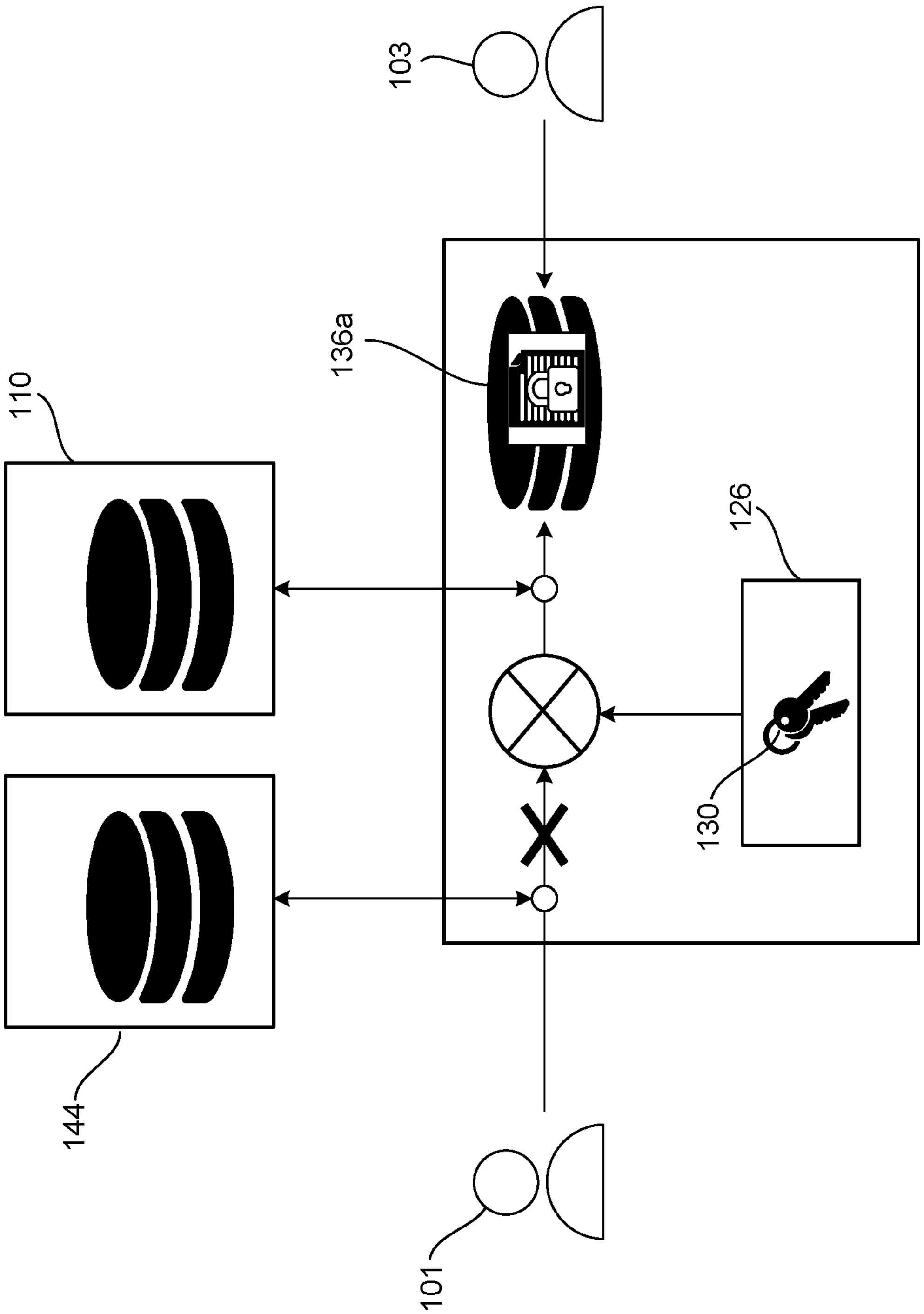
FIG. 1C illustrates a recovery workflow for a computing device according to an aspect.

FIG. 1A illustrates a recovery system 100 for recovering encrypted data 136*a* on a computing device 120 according to an aspect. FIG. 1B illustrates a login workflow for a computing device 120 according to an aspect. FIG. 1C illustrates a recovery workflow for a computing device 120 according to an aspect. Referring to FIG. 1A, the computing device 120 includes an encryption unit 133 configured to encrypt data 136. The data 136 may be referred to as encrypted data 136*a* when the data 136 is encrypted. The data 136 may be referred to as decrypted data 136*b* when the data 136 is decrypted. The encryption unit 133 may encrypt the data 136 when a user 101 is logged off (or signed out) of a computing session of the computing device 120. In some examples, a user 101 is logged off (or signed out) of a computing session when the computing device 120 requires entry of the user's authentication credential 138 to gain access to at least some of the functionalities of the computing device 120.

The encryption unit 133 may encrypt the data 136 when the user intentionally logs off (or signs out) of the computing session. The encryption unit 133 may encrypt the data 136 in response to the expiration of a certain period of inactivity (e.g., no user commands are received over a period of time). The data 136 that is encrypted may be user data and/or data generated by a user 101 during use of the computing device 120. In some examples, the data 136 includes any data that is stored on or accessible via the computing device 120. In some examples, the data 136 may represent a portion of the data that is stored on the computing device 120.

In some examples, the computing device 120 is associated with a user account, and the authentication credential 138 is the authentication credential for the user account. A user 101 may provide their authentication credential 138 to the computing device 120 to decrypt the encrypted data 136*a* and/or gain access to at least some of the functionalities of the computing device 120. In some examples, the user 101 provides their authentication credential 138 via an authentication interface 142 that is rendered on a display 140 of the computing device 120. The authentication interface 142 may be any type of interface that receives an authentication credential 138. In some examples, the authentication interface 142 includes an entry screen (e.g., a log-in screen) for user identification and authentication. In some examples, the authentication interface 142 is referred to as a recovery screen in the event that the user's authentication credential 138 is unavailable. In some examples, the user 101 can provide their authentication credential 138 without using an authentication interface 142.

The authentication credential 138 may be information that is used to authenticate the person that is attempting to access the data 136 and/or access some of the functionalities of the computing device 120. The authentication credential 138 may be any type of data structure, object, or document that identifies a user. In some examples, the authentication credential 138 includes a password (or referred to as passphrase). The password may be in the form of a string of letters, numbers, and/or special characters. In some examples, the authentication credential 138 includes a digital certificate. A digital certificate may include the digital identifier of a user (e.g., a public key), and the digital signature of a certificate authority. In some examples, the authentication credential 138 includes biometric data. In some examples, the biometric data may include a facial scan, an iris scan, a fingerprint scan, and/or voice data.

The authentication credential 138 may be authenticated by an authentication system 144. The authentication system 144 may be any type of system that can authenticate a user based on the authentication credential 138 such as a password-based authentication system, a certificate-based authentication system, a biometric-based authentication system, and/or a multi-factor based authentication system. The password-based authentication system may use passwords to authenticate a user. The certificate-based authentication system may verify the credibility of the digital signature and the certificate authority and may use cryptography to confirm that the user has a correct private key associated with the certificate.

The biometric-based authentication system may use biometrics to authenticate a user. In some examples, the biometric-based authentication system may use facial recognition that matches the different face characteristics of an individual trying to gain access to an approved face stored in a database. In some examples, the biometric-based authentication system may examine a speaker's speech patterns for the formation of specific shapes and sound qualities and may rely on standardized words to identify users. In some examples, the biometric-based authentication system may match the unique patterns on an individual's fingerprints. In some examples, the biometric-based authentication system may include iris recognition and/or retina scanners, where patterns are compared to approved information stored in a database. The multi-factor based authentication system may use two or more independent ways to identify a user (e.g., codes generated from the user's device, Captcha tests, fingerprints, and/or facial recognition, etc.).

In some examples, the computing device 120 communicates with an authentication system 144 over a network 150 in order to authenticate the user 101. For example, the computing device 120 may transmit, over the network 150, an encrypted transmission to the authentication system 144. In some examples, the encrypted transmission includes the authentication credential 138. In some examples, the encrypted transmission includes an encrypted version of the authentication credential 138, where the authentication system 144 decrypts the authentication credential 138. The authentication system 144 is configured to authenticate the authentication credential 138, and if the authentication credential 138 is authenticated, the authentication system 144 is configured to transmit an authentication response 146 that indicates that the user 101 is authenticated. In some examples, the authentication credential 138 is authenticated locally on the computing device 120. In some examples (not shown), the authentication system 144 is included on the computing device 120.

Referring to FIGS. 1A and 1B, the computing device 120 includes a crypto-processor 126 configured to receive the (authenticated) authentication credential 138. In response to receipt of the authentication credential 138, and if the authentication credential 138 corresponds to the user 101, the crypto-processor 126 is configured to release a first key portion 130 to the decryption unit 132. As indicated above, the user's authentication credential 138 may be a password associated with the computing device 120 or a user account associated with the computing device 120. However, the authentication credential 138 may include other forms of identifying information such as a digital certificate or biometrics data (e.g., facial scan, iris scan, fingerprint scan, audio data, etc.).

The first key portion 130 may be a secret key that is stored inside the crypto-processor 126. A secret key is a type of cryptographic secret. There could be other cryptographic secrets that are various kinds of secret keys or could also be representing the outcome of a secure computation that is performed inside the hardware security module 110. The crypto-processor 126 may be a dedicated computer-on-a-chip or microprocessor for executing cryptographic operations. In some examples, the crypto-processor 126 is a security chip. In some examples, the crypto-processor 126 is a trusted platform module. In some examples, the crypto-processor 126 is embedded in a package with one or more physical security measures. The decryption unit 132 may receive the authentication credential 138 and the first key portion 130, and the decryption unit 132 may recover the decryption key 134 using the authentication credential 138 and the first key portion 130. In some examples, the decryption unit 132 is configured to execute on an application processor of the computing device 120, which may be a separate module/package from the crypto-processor 126. An application processor may be a system-on-chip (SOC) that controls application functions of the computing device 120. In some examples, the decryption unit 132 is configured to execute within the crypto-processor 126. In some examples, instead of using a crypto-processor 126, the described functions of the crypto-processor 126 may be executed by the application processor of the computing device 120.

In some examples, the decryption unit 132 may require both of the authentication credential 138 and the first key portion 130 to recover the decryption key 134. In some examples, as shown in FIGS. 1A and 1B, the authentication credential 138 and the first key portion 130 are combined to form an encryption key (e.g., a wrapping key, such as a symmetric wrapping key), where the encryption key is used to decrypt the decryption key 134. If the authentication credential 138 is a password, the password and the first key portion 130 are combined to form an encryption key (e.g., a wrapping key), and the encryption key is used to decrypt the decryption key 134. If the user changes their password on the computing device 120, the computing device 120 may generate a new encryption key from the new password and the first key portion 130 and encrypt the decryption key 134 using the new encryption key, deleting the prior encrypted decryption key 134. Thus, the decryption key 134 may be recovered, derived from, and/or associated with the password. However, if the user changes the password for the user account on another device, a recovery process may be needed to recover the decryption key 134. If the authentication credential 138 includes biometric data or a digital certificate, the biometric data or digital certificate data may be used in combination with the first key portion 130 to decrypt the decryption key 134. A similar change in the biometric used or the digital certificate may cause a change in the encryption of the decryption key 134.

In some examples, a third party 103 may require access to some of the encrypted data 136*a* on the computing device 120. For example, the third party 103 may be associated with an organization 152 that owns or manages the user's computing device 120. For example, the computing device 120 may be an enterprise-owned computing device such as a work computer owned or managed by the user's company or a school computer owned or managed by the user's school. For one or more reasons (e.g., governance, risk management, legal, and/or compliance reasons), the organization 152 may require access to the encrypted data 136*a* on the computing device 120. However, without the user's authentication credential 138, according to conventional techniques, the decryption unit 132 will not be able to derive the decryption key 134.

The recovery system 100 includes a server computer 102 having a recovery service module 108. The recovery service module 108 includes a hardware security module 110 that stores and manages key portions associated with users of computing devices. The hardware security module 110 may be a computing device (e.g., a physical computing device) that manages encryption keys and performs encryption and decryption functions and other cryptographic functions.

In some examples, although this disclosure describes the recovery system 100 with respect to a single hardware security module 110, the recovery service module 108 may include a group of hardware security modules 110. The hardware security module 110 may store and manage a second key portion 131 that, when recovered, is used in combination with the first key portion 130 to recover a decryption key 134 to decrypt the encrypted data 136*a* on the computing device 120. The second key portion 131 is a portion of the information that is used to recover the decryption key 134. The second key portion 131 may be a secret key that is stored inside the hardware security module 110. As indicated above, a secret key is a type of cryptographic secret. There could be other cryptographic secrets that are various kinds of secret keys or could also be representing the outcome of a secure computation that is performed inside the hardware security module 110. In some examples, the first key portion 130 and the second key portion 131 are private keys (e.g., secret keys) of an elliptic curve key pair. Elliptic curve cryptography (ECC) is a key-based technique for encrypting data. However, the first key portion 130 and/or the second key portion 131 could be the private/secret portion of some other scheme (other than elliptic curves) that supports public key cryptography. In some examples, the first key portion 130 and the second key portion 131 are large integers (e.g., very large integers). In some examples, the first key portion 130 and the second key portion 131 could be some cryptographic material (e.g., either a secret key, or the result of a cryptographic computation).

Although FIG. 1A is described with the hardware security module 110 storing a second key portion 131 relating to a single user, it is noted that the hardware security module 110 (or a group of hardware security modules 110) may store second key portions 131 for many users (e.g., hundreds, thousands, or millions of users). The second key portion 131 stored at the hardware security module 110 by itself is not sufficient to recover a decryption key 134 relating to a particular user or a particular device.

The organization 152 may enroll the computing device 120 in the recovery system 100 prior to or after its distribution to a user so that one or more persons (e.g., authorized third parties) associated with the organization 152 can access the encrypted data 136*a* and/or user's computing device 120 in the event that the user is unavailable or uncooperative and the third party 103 has physical possession of the computing device 120. In some examples, the user 101 may have to opt-in to permit the organization 152 to enroll the computing device 120 in the recovery service. In some examples, after the organization 152 enrolls for the recovery service, the computing devices 120 of that organization 152 are on-boarded the first time the user 101 logs into their computing device 120. In some examples, the organization 152 may enroll one or more of their computing devices 120 before the computing devices 120 are handed over to the users.

The recovery system 100 may store enrollment data 128 associated with the user's computing device 120. The enrollment data 128 may identify one or more people (or roles/types of people) within the organization 152 that can access the user's encrypted data 136*a* in the event that the user 101 is unavailable or uncooperative. For example, the enrollment data 128 may specify an authorized third party by identifying a user account that is authorized to gain entry to the user's encrypted data 136*a*. The user account may be assigned to a particular person or a particular role in the organization 152 (e.g., a manager, director, a human resources supervisor, etc.). The third party 103 may use the user's computing device 120 or another computing device to enroll in the recovery system 100. For instance, a computing device may render one or more user interfaces that permit the third party 103 to enroll in the recovery system 100 and enter one or more authorized user accounts.

The crypto-processor 126 on the computing device 120 may store the enrollment data 128. In some examples, the recovery service module 108 (e.g., the hardware security module 110) on the server computer 102 may store the enrollment data 128. In some examples, the third party 103 may use the computing device 120 (or a different computing device) to enroll and provide the enrollment data 128, where the recovery service module 108 stores at least a portion of the enrollment data 128 at the hardware security module 110. In some examples, the recovery service module 108 may transmit at least a portion of the enrollment data 128 to the crypto-processor 126 for storage thereon. In some examples, the third party 103 may use the computing device 120 to enroll and provide the enrollment data 128, where the crypto-processor 126 stores at least a portion of the enrollment data 128, and the crypto-processor 126 transmits at least a portion of the enrollment data 128 to the hardware security module 110 for storage thereon.

In some examples, in response to the computing device 120 being enrolled in the recovery system 100, the first key portion 130 and the second key portion 131 are generated. In some examples, the first key portion 130 and the second key portion 131 are generated by software executing on the computing device 120. In some examples, the first key portion 130 is encrypted so only the hardware security module 110 can access the first key portion 130. In some examples, the second key portion 131 is only available to the crypto-processor 126. At this time, the encrypted first key portion 130 continues to reside on the crypto-processor 126. However, in some examples, the first key portion 130 may be stored elsewhere on the computing device 120, since the first key portion 130 is encrypted and may not be inappropriately accessed.

In some examples, the hardware security module 110 may generate the first key portion 130 and the second key portion 131. The hardware security module 110 may store the second key portion 131. In some examples, the second key portion 131 is encrypted. In some examples, in response to the computing device 120 being enrolled in the recovery system 100, the hardware security module 110 may generate the first key portion 130 and transmit the first key portion 130 to the crypto-processor 126, where the crypto-processor 126 securely stores the first key portion 130. In some examples, in response to the computing device 120 being enrolled in the recovery system 100, the crypto-processor 126 may generate the first key portion 130 and the second key portion 131, and the crypto-processor 126 may transmit the second key portion 131 to the hardware security module 110. In some examples, the second key portion 131 is encrypted and stored at the hardware security module 110.

Referring to FIGS. 1A and 1C, the third party 103 may provide their authentication credential 138, which, when authenticated (e.g., by the authentication system 144), causes the crypto-processor 126 to determine whether the authentication credential 138 corresponds to (or matches) one of the authorized user accounts in the enrollment data 128 stored on the crypto-processor 126. If the third party's authentication credential 138 is one of the authorized user accounts, the crypto-processor 126 may release the first key portion 130 (stored on the computing device 120) to the decryption unit 132.

Figure 2:
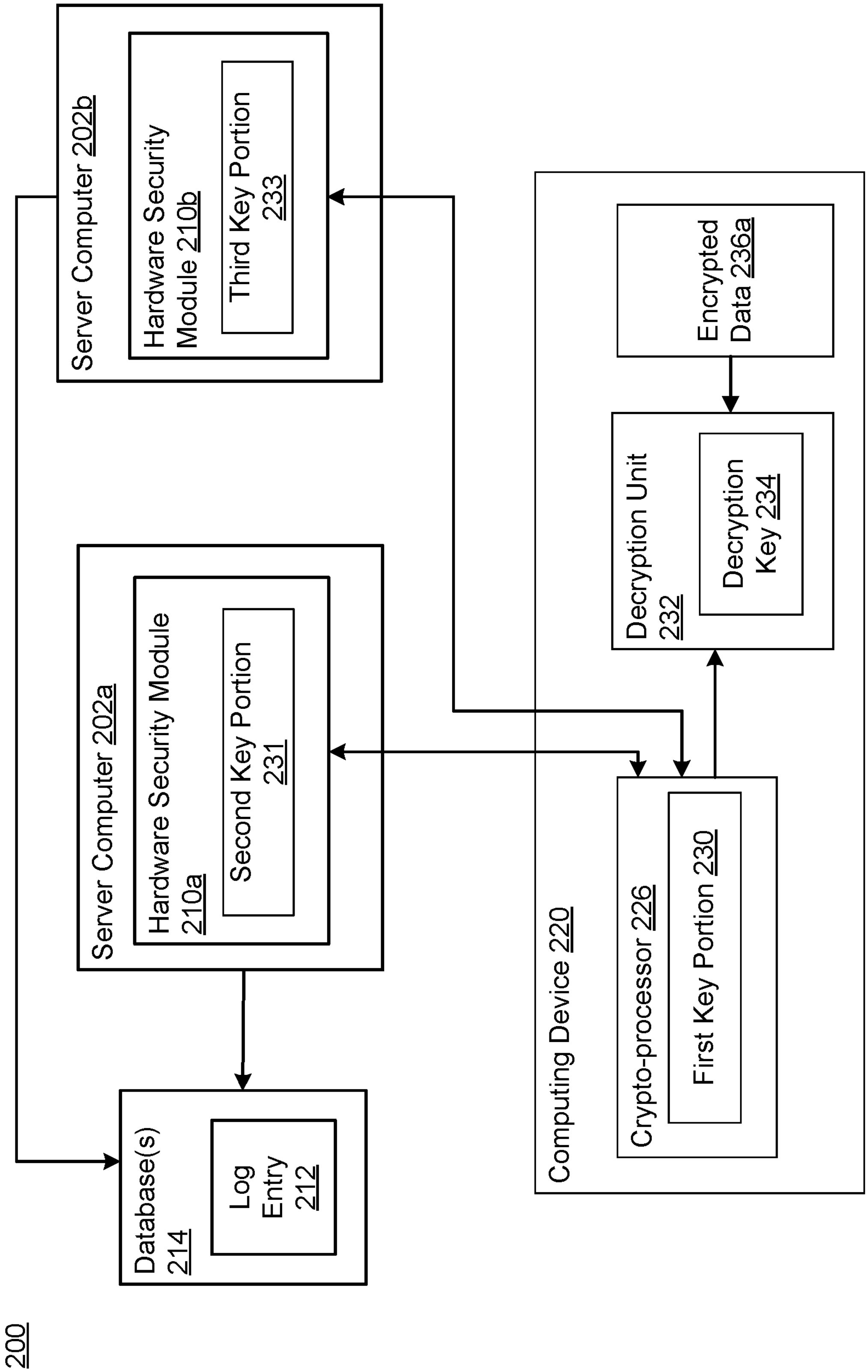
FIG. 2 illustrates a recovery system for recovering encrypted data on a computing device according to another aspect.

Also, if the third party's authentication credential 138 is one of the authorized user accounts identified in the enrollment data 128, the crypto-processor 126 is configured to communicate via a protocol 105 with the hardware security module 110 to obtain the second key portion 131 stored at the hardware security module 110. In some examples, the protocol 105 includes a multi-party decryption protocol involving the crypto-processor 126 and the hardware security module 110. In some examples, the protocol 105 includes more than two parties such as a three-party protocol as shown in FIG. 2. Still further, the protocol 105 may include a four-party protocol or five-party protocol. The crypto-processor 126 may transmit, over a network 150, a key request to the hardware security module 110, where the key request includes identification information about the third party, identification information about the user, and/or identification information about the computing device 120. In some examples, the key request may include authorization information to confirm that the request has been validated through the identity/authorization (e.g., validated through the authentication system 144). In some examples, the hardware security module 110 uses the identification information about the third party 103 or the user 101 from the key request to perform its own authentication on the server-side. In some examples, the hardware security module 110 may perform (e.g., independently perform) an authentication check to authenticate the third party 103 (or the user 101) before returning the second key portion 131. In some examples, the server computer 102 may include or communicate with an authentication system 144.

In some examples, the crypto-processor 126 communicates with the hardware security module 110 via a reverse proxy. For example, the computing device 120 may contact the recovery service module 108, and the recovery service module 108 may connect to a reverse proxy, and the reverse proxy disintermediates the hardware security module 110. In some examples, the crypto-processor 126 may send an encrypted payload (e.g., the key request), where the payload is encrypted with the hardware security module's public key. The hardware security module 110 may return an encrypted (and/or signed) response with the second key portion 131. In some examples, the crypto-processor 126 may generate the encrypted payload during the enrollment process, where the crypto-processor 126 transmits the encrypted payload during recovery. The encrypted payload may include user type, user account identifier, and/or identification information about the computing device 120.

Before the second key portion 131 is returned to the computing device 120, a log entry 112 is made in a database 114 to publicly record the access to the computing device 120. In some examples, a log entry 112 is recorded in a single database 114. In some examples, a log entry 112 is recorded in multiple databases 114. For example, the recovery service module 108 includes a database recorder 111 configured to record a log entry 112 in one or more databases 114. Before the second key portion 131 is transmitted to the computing device 120, the database recorder 111 is configured to communicate with the database 114 over the network 150 to record a log entry 112 in the database 114. The log entry 112 may include information about the access to the computing device 120. For example, the log entry 112 may include the time, date, identification of the computing device

120, and/or identification of the person, role of the person, and/or the organization that has gained access to the computing device 120.

In some examples, the database 114 is a database whose records are publicly available. In some examples, the database 114 is a public ledger. In some examples, the database 114 is accessible to a portion of the public. In some examples, the database 114 resides at a computing device that is separate from the server computer 102. In some examples, the database 114 is included within the server computer 102. The database recorder 111 may receive a response indicating that the recording of the log entry 112 was successful. The hardware security module 110 may determine whether the response that indicates that the log entry 112 was successful, and then transmit a response that includes the second key portion 131. In some examples, the response may include information (e.g., proof) that the access request has been logged in the database 114.

In some examples, the database 114 may record all recovery attempts. In some examples, the database 114 may record unsuccessful recovery attempts. The hardware security module 110 may cause a log entry 112 to be recorded in the database 114 in response to an unsuccessful recovery attempt. For example, the hardware security module 110 may receive a malformed request in which the hardware security module 110 could not decrypt and/or access. In some examples, the hardware security module 110 may cause a log entry 112 to be recorded in the database 114 if the signature (or portion thereof) of the sender was determined as invalid (e.g., an attacker that was trying to impersonate the laptop/requestor). However, there may be a number of reasons in which the recovery attempt is unsuccessful including accidental and/or malicious attempts. In some examples, the hardware security module 110 may attempt to authenticate the requestor (e.g., the user 101 or the third party 103) using an authentication system 144, and if unauthenticated, the hardware security module 110 may cause the recording of a log entry 112 in the database 114 and return a deny response to the requestor.

Then, the decryption unit 132 on the computing device 120 may use the first key portion 130 and the second key portion 131 to recover a decryption key 134 and the decryption key 134 is used to decrypt the encrypted data 136*a*. In some examples, the first key portion 130 and the second key portion 131 are combined to decrypt the decryption key 134, and the decryption key 134 is used to decrypt the encrypted data. In some examples, the first key portion 130 and the second key portion 131 to form a symmetric wrapping key, and the symmetric wrapping key is used to cover the decryption key 134.

In some examples, the recovery system 100 can securely provide access to the encrypted data 136*a* when the user 101 has changed their password on another device (or using a browser) and the user 101 does not have access to their password and the user 101 is in possession of the computing device 120. For example, the user may provide their authentication credential 138, and when authenticated (e.g., by the authentication system 144), the crypto-processor 126 receives the authentication credential 138. The user may be authenticated in other ways (e.g., using an old password, recovery methods such as email or phone verification). In some examples, the user 101 has forgotten their previous password for obtaining access to the encrypted data 136*a*, but the user 101 has their login password for the authentication system 144. In some examples, if the user 101 has forgotten their password for the authentication system 144, the server computer 102 may potentially reset this password and authenticate the user 101 in some way so that the user 101 can initiate this recovery process to get access to the encrypted data 136*a*.

Since the authentication credential is not the current authentication credential (that is combined with the first key portion 130) to recover the decryption key 134, the crypto-processor 126 may trigger the recovery service, e.g., by communicating with the hardware security module 110 to obtain the second key portion 131 (in the same manner as described above), where the second key portion 131 is released to the crypto-processor 126 after the log entry 112 is recorded in the database 114.

The computing device 120 can be any type of device having one or more processors 122 and one or more memory devices 123, where the memory device(s) 123 store encrypted data 136*a*. The processor(s) 122 may be formed in a substrate configured to execute one or more machine executable instructions or pieces of software, firmware, or a combination thereof. The processor(s) 122 can be semiconductor-based—that is, the processors can include semiconductor material that can perform digital logic. The memory device(s) 123 may include a main memory that stores information in a format that can be read and/or executed by the processor(s) 122. Also, the memory device(s) 123 may store executable instructions that, when executed by the processors 122, perform the functionalities discussed with reference to the computing device 120.

The computing device 120 may be any type of consumer computing device such as a laptop, a smartphone, a tablet, a desktop computing device, gaming console, a smart television, or wearable device, etc. In some examples, the computing device 120 is a server computer. The computing device 120 may store data 136 that may be encrypted. In some examples, the encrypted data 136*a* include data associated with the user 101.

The computing device 120 may communicate with the server computer 102 over a network 150. The server computer 102 may be computing devices that take the form of a number of different devices, for example a standard server, a group of such servers, or a rack server system. In some examples, the server computer 102 may be a single system sharing components such as processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150. Network 150 may further include any number of hardwired and/or wireless connections.

The server computer 102 may include one or more processors 104 formed in a substrate, an operating system (not shown) and one or more memory devices 106. The memory device(s) 106 may represent any kind of (or multiple kinds of) memory (e.g., RAM, flash, cache, disk, tape, etc.). In some examples (not shown), the memory device(s) 106 may include external storage, e.g., memory physically remote from but accessible by the server computer 102. The server computer 102 may include one or more modules or engines representing specially programmed software.

FIG. 2 illustrates a recovery system 200 that uses a multi-party recovery protocol for providing recovery access to encrypted data 236*a* on a computing device 220. The recovery system 200 may be an example of the recovery system 100 of FIGS. 1A through 1C and may include any of the details discussed with reference to those figures. In some examples, the recovery system 200 is a three-party system, which includes a computing device 220 storing a first key portion 230, a server computer 202*a* storing a second key portion 231, and a server computer 202*b* storing a third key portion 233. In some examples, the server computer 202*b* is associated with an entity or organization that has enrolled in the recovery system 200.

The first key portion 230, the second key portion 231, and the third key portion 233 are used (e.g., combined) to recover a decryption key 234 to decrypt the encrypted data 236*a*. In some examples, the recovery system 200 uses more than three parties such as a four party or five party system in which a fourth key portion is stored at another computing device, a fifth key portion is stored at another computing device, and so forth.

A third party may require access to some of the encrypted data 236*a* on the computing device 220. For example, the third party may be associated with an organization that owns or manages the user's computing device 220. In some examples, the server computer 202*b* is owned or managed by the organization. However, without the user's authentication credential associated with the encrypted data 236*a*, according to some conventional techniques, the decryption unit 232 will not be able to derive the decryption key 234.

The recovery system 200 includes a server computer 202*a* having a hardware security module 210*a* that stores and manages key portions (e.g., second key portions 231) associated with users of computing devices. In some examples, the server computer 202*a* is not associated with the organization. In some examples, the server computer 202*a* is a third party service that stores and manages key portions associated with users of computing devices. The hardware security module 210*a* may be a computing device (e.g., a physical computing device) that manages encryption keys and performs encryption and decryption functions and other cryptographic functions. It is noted that the server computer 202*a* may include a single hardware security module 210*a* or a group of hardware security modules 210*a*. The hardware security module 210*a* may store and manage a second key portion 231 that, when recovered, is used in combination with the first key portion 230 and the third key portion 233 to recover a decryption key 234 to decrypt the encrypted data 236*a* on the computing device 220.

The recovery system 200 includes a server computer 202*b* having a hardware security module 210*b* that stores and manages key portions (e.g., third key portions 233) associated with users of computing devices associated with an entity or organization. In some examples, the server computer 202*a* stores and manages key portions for users using computing devices (e.g., Apple users, Google users, Microsoft users, etc.), and the server computer 202*b* stores and manages key portions for computing devices owned or managed by an organization or entity. The hardware security module 210*b* may be a computing device (e.g., a physical computing device) that manages encryption keys and performs encryption and decryption functions and other cryptographic functions. It is noted that the server computer 202*b* may include a single hardware security module 210*b* or a group of hardware security modules 210*b*. The hardware security module 210*b* may store and manage a third key portion 233 that, when recovered, is used in combination with the first key portion 230 and the second key portion 231 to recover a decryption key 234 to decrypt the encrypted data 236*a* on the computing device 220.

In some examples, each of the first key portion 230, the second key portion 231, and the third key portion 233 is a portion of the information that is used to recover the decryption key 234. A key portion (e.g., either the first key portion 230, the second key portion 231, and the third key portion 233) may be a secret key that is stored inside a respective device. A secret key is a type of cryptographic secret. There could be other cryptographic secrets that are various kinds of secret keys or could also be representing the outcome of a secure computation that is performed inside the hardware security module 210*a*, the hardware security module 210*b*, or the crypto-processor 226. In some examples, the first key portion 230, the second key portion 231, and the third key portion 233 are private keys (e.g., secret keys) of an elliptic curve key pair. However, the first key portion 230, the second key portion 231, and/or the third key portion 233 could be the private/secret portion of some other scheme (other than elliptic curves) that supports public key cryptography.

The organization may enroll the computing device 220 in the recovery system 200 prior to or after its distribution to a user so that one or more persons (e.g., authorized third parties) associated with the organization can access the encrypted data 236*a* and/or user's computing device 220 in the event that the user is unavailable or uncooperative and the third party has physical possession of the computing device 220.

The recovery system 200 may store enrollment data (e.g., the enrollment data 128 of FIG. 1A) associated with the user's computing device 220. In some examples, the enrollment data is stored at the computing device 220. In some examples, the enrollment data is stored at the server computer 202*a*. In some examples, the enrollment data is stored at the server computer 202*b*. The enrollment data may identify one or more people (or roles/types of people) within the organization that can access the user's encrypted data 236*a* in the event that the user is unavailable or uncooperative. For example, the enrollment data may specify an authorized third party by identifying a user account that is authorized to gain entry to the user's encrypted data 236*a*. The user account may be assigned to a particular person or a particular role in the organization (e.g., a manager, director, a human resources supervisor, etc.). The third party may use the user's computing device 220 or another computing device to enroll in the recovery system 200. For instance, a computing device may render one or more user interfaces that permit the third party to enroll in the recovery system 200 and enter one or more authorized user accounts.

In some examples, the third party may use the computing device 220 (or a different computing device) to enroll and provide the enrollment data, where the enrollment data may be stored on the computing device 220, the server computer 202*a*, and/or the server computer 202*b*. In some examples, in response to the computing device 220 being enrolled in the recovery system 200, the first key portion 230, the second key portion 231, and the third key portion 233 are generated. In some examples, the first key portion 230, the second key portion 231, and the third key portion 233 are generated by software executing on the computing device 220. The second key portion 231 may be securely transmitted to the server computer 202*a* for storage thereon. The third key portion 233 may be securely transmitted to the server computer 202*b* for storage thereon. In some examples, the first key portion 230, the second key portion 231, and the third key portion 233 are generated by the server computer 202*a*. The first key portion 230 may be securely transmitted to the computing device 220 for storage thereon. The third key portion 233 may be securely transmitted to the server computer 202*b* for storage thereon. In some examples, the first key portion 230, the second key portion 231, and the third key portion 233 are generated by the server computer 202*b*. The first key portion 230 may be securely transmitted to the computing device 220 for storage thereon. The second key portion 231 may be securely transmitted to the server computer 202*a* for storage thereon. In some examples, the first key portion 230 is generated by the computing device 220, the second key portion 231 is generated by the server computer 202*a*, and the third key portion 233 is generated by the server computer 202*b*.

The third party may provide their authentication credential, which, when authenticated, causes the crypto-processor 226 to determine whether the third party's authentication credential corresponds to (or matches) one of the authorized user accounts in the enrollment data stored on the crypto-processor 226. If the third party's authentication credential is one of the authorized user accounts, the crypto-processor 226 may release the first key portion 230 to the decryption unit 232.

Also, if the third party's authentication credential is one of the authorized user accounts identified in the enrollment data, the crypto-processor 226 is configured to communicate with the hardware security module 210*a* to obtain the second key portion 231 and communicate with the hardware security module 210*b* to obtain the third key portion 233. In some examples, the crypto-processor 226 may transmit, over a network, a key request to the hardware security module 210*a*, where the key request includes identification information about the third party, identification information about the user, and/or identification information about the computing device 220. In some examples, the hardware security module 210*a* uses the identification information about the third party from the key request to perform its own authentication on the server-side. In some examples, the hardware security module 210*a* may perform (e.g., independently perform) an authentication check to authenticate the third party before returning the second key portion 231.

Before the second key portion 231 is returned to the computing device 220, a log entry 212 is made in a database 214 to publicly record the access to the computing device 220. The log entry 212 may include information about the access to the computing device 220. For example, the log entry 212 may include the time, date, identification of the computing device 220, and/or identification of the person, role of the person, and/or the organization that has gained access to the computing device 220. In some examples, the database 214 is a database whose records are publicly available. In some examples, the database 214 is a public ledger.

Also, if the third party's authentication credential is one of the authorized user accounts identified in the enrollment data, the crypto-processor 226 is configured to communicate with the hardware security module 210*b* to obtain the third key portion 233. In some examples, the crypto-processor 226 may transmit, over a network, a key request to the hardware security module 210*b*, where the key request includes identification information about the third party, identification information about the user, and/or identification information about the computing device 220. In some examples, the hardware security module 210*b* uses the identification information about the third party from the key request to perform its own authentication on the server-side. In some examples, the hardware security module 210*b* may perform (e.g., independently perform) an authentication check to authenticate the third party before returning the third key portion 233.

In some examples, before the third key portion 233 is returned to the computing device 220, the hardware security module 210*b* may communicate with the database 214 to determine whether or not the log entry 212 was recorded in the database 214. If so, the hardware security module 210*b* may transmit a response that includes the third key portion 233 to the crypto-processor 226. In some examples, the hardware security module 210*a* is configured to record log entries 212 in the database 214. In some examples, the hardware security module 210*b* is configured to record log entries 212 in the database 214. In some examples, the hardware security module 210*a* and the hardware security module 210*b* may independently record accesses in the database 214. In some examples, the hardware security module 210*a* and the hardware security module 210*b* may record separate log entries 212 in separate databases 214. In some examples, the recovery system 200 includes multiple (separate) databases 214 such as a first database that records accesses to the computing device 220 and a second database that records accesses to the computing device 220. In some examples, the hardware security module 210*a* may record a log entry 212 into the first database. In some examples, the hardware security module 210*b* may record a log entry 212 into the second database.

The log entry 212 may include information about the access to the computing device 220. For example, the log entry 212 may include the time, date, identification of the computing device 220, and/or identification of the person, role of the person, and/or the organization that has gained access to the computing device 220. In some examples, the database 214 is a database whose records are publicly available. In some examples, the database 214 is a public ledger.

Then, the decryption unit 232 on the computing device 220 may use the first key portion 230, the second key portion 231, and the third key portion 233 to recover a decryption key 234 and the decryption key 234 is used to decrypt the encrypted data 236*a*. In some examples, the first key portion 230, the second key portion 231, and the third key portion 233 are combined to decrypt the decryption key 234, and the decryption key 234 is used to decrypt the encrypted data 236*a*. In some examples, the first key portion 230, the second key portion 231, and the third key portion 233 are used to form a wrapping key (e.g., symmetric wrapping key), and the wrapping key is used to cover the decryption key 234.

In some examples, the recovery system 200 can securely provide access to the encrypted data 236*a* when the user has changed their password and the user does not have access to their password and the user is in possession of the computing device 220. The user may be authenticated in other ways (e.g., using an old password, recovery methods such as email or phone verification). In some examples, the user has forgotten their previous password for obtaining access to the encrypted data 236*a*, but the user has their login password for an authentication system associated with the computing device 220. In some examples, if the user has forgotten their password for the authentication system, the server computer 202*a* may potentially reset this password and authenticate the user in some way so that the user can initiate this recovery process to get access to the encrypted data 236*a*. When authenticated, the crypto-processor 226 may trigger the recovery service, e.g., by communicating with the hardware security module 210*a* to obtain the second key portion 231 (in the same manner as described above) and communicating with the hardware security module 210*b* to obtain the third key portion 233, where at least one of the second key portion 231 or the third key portion 233 are released to the crypto-processor 226 after the log entry 212 is recorded in the database 214.

Figure 3:
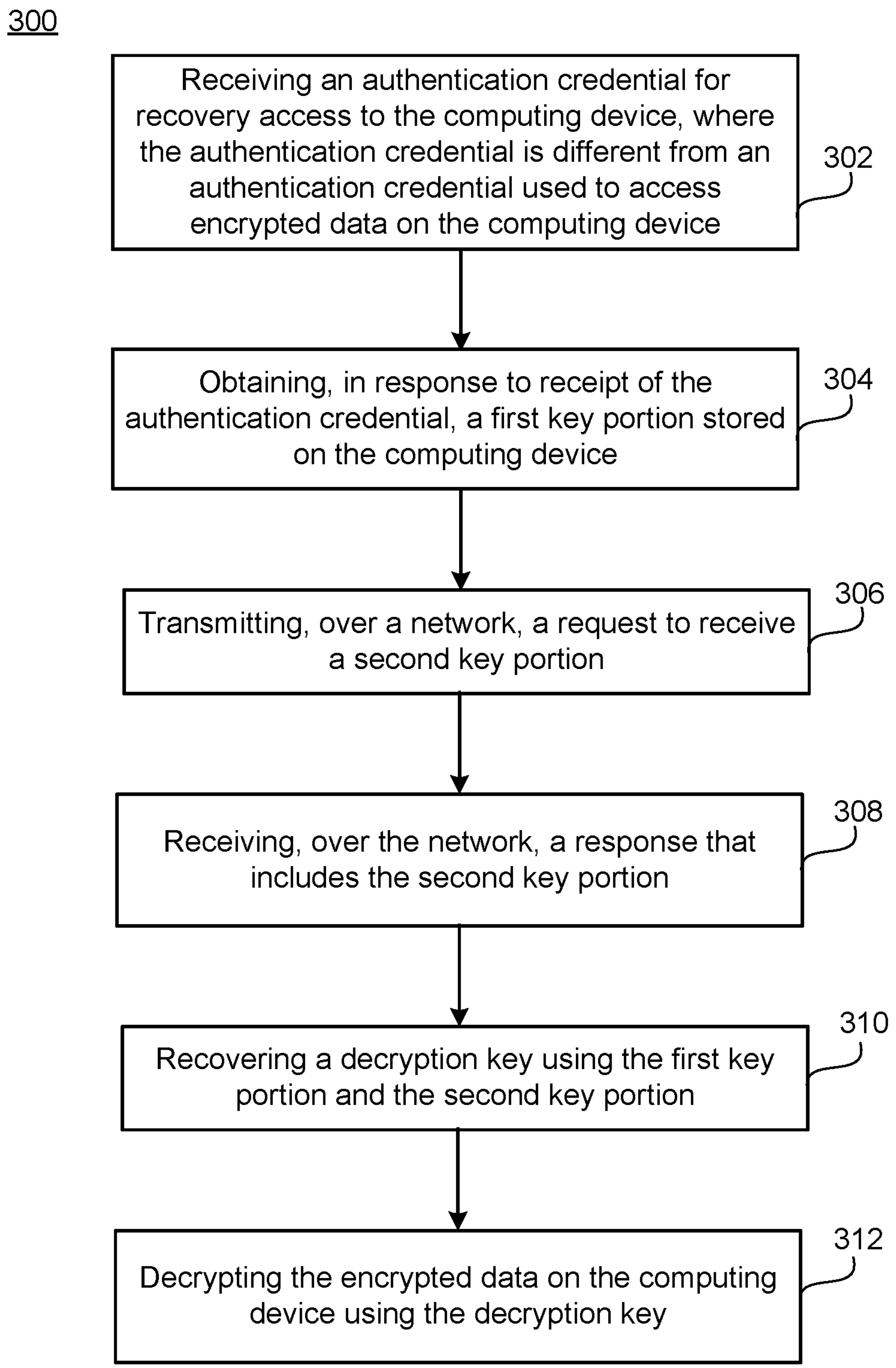
FIG. 3 illustrates a flowchart depicting example operations of a recovery system according to an aspect.

FIG. 3 illustrates a flowchart 300 depicting example operations of a recovery system according to an aspect. Although the flowchart 300 of FIG. 3 illustrates the operations in sequential order, it will be appreciated that this is merely an example, and that additional or alternative operations may be included. Further, operations of FIG. 3 and related operations may be executed in a different order than that shown, or in a parallel or overlapping fashion. Although the flowchart 300 is described with reference to the recovery system 100 of FIGS. 1A through 1C, the flowchart 300 may be executed according to any of the systems described herein including the recovery system 200 of FIG. 2.

The flowchart 300 may be executable by the recovery system 100 of FIGS. 1A to 1C. In some examples, the flowchart 300 may be executable by the recovery system 200 of FIG. 2. In some examples, the flowchart 300 depicts operations performed by the computing device 120. For example, when recovering data 136 that has been encrypted, the computing device 120 may perform the operations of FIG. 3. The operations of FIG. 3 may be applicable when a third party 103 is attempting to access the computing device 120 and the third party 103 has possession of the computing device 120. Also, the operations of FIG. 3 may be applicable when a user 101 has possession of the computing device 120, but the user's current authentication credential 138 is not known to the user 101. In other words, the user's authentication credential 138 for accessing the encrypted data 136*a* is not known to the user.

Operation 302 includes receiving an authentication credential 138 for recovery access to the computing device 120, where the authentication credential 138 is different from an authentication credential used to access the encrypted data 136*a* on the computing device 120. In some examples, the authentication credential 138 is associated with a third party 103 that owns or manages the computing device 120. In some examples, the authentication credential 138 is associated with a user 101 of the computing device 120. For example, the user may be authenticated in a number of different ways. The password for accessing the encrypted data 136*a* may be lost or forgotten, but the computing device 120 may receive an authentication credential 138 that is different from the password that is used to access the encrypted data 136, and that authentication credential 138 is used to authenticate the user 101.

Operation 304 includes obtaining, in response to receipt of the authentication credential 138, a first key portion 130 stored on the computing device. In some examples, the first key portion 130 is stored on a crypto-processor 126 of the computing device 120. In some examples, the first key portion 130 is obtained (e.g., released) when the authentication credential 138 is authenticated. In some examples, the first key portion 130 is obtained when the authentication credential 138 is authenticated and the third party 103 is included in the enrollment data 128. Operation 306 includes transmitting, over a network 150, a request to receive a second key portion 131. In some examples, the second key portion 131 is stored on a hardware security module 110 at a server computer 102. Operation 308 includes receiving, over the network 150, a response that includes the second key portion 131. In some examples, the hardware security module 110 returns the second key portion 131 after a log entry 112 is recorded in a database 114. In some examples, the hardware security module 110 returns the second key portion 131 if the hardware security module 110 has independently authenticated the authentication credential 138 and/or determines that the third party 103 is included on the enrollment data 128. Operation 310 includes recovering a decryption key 134 using the first key portion 130 and the second key portion 131. Operation 312 includes decrypting the encrypted data 136*a* on the computing device 120 using the decryption key 134.

Figure 4:
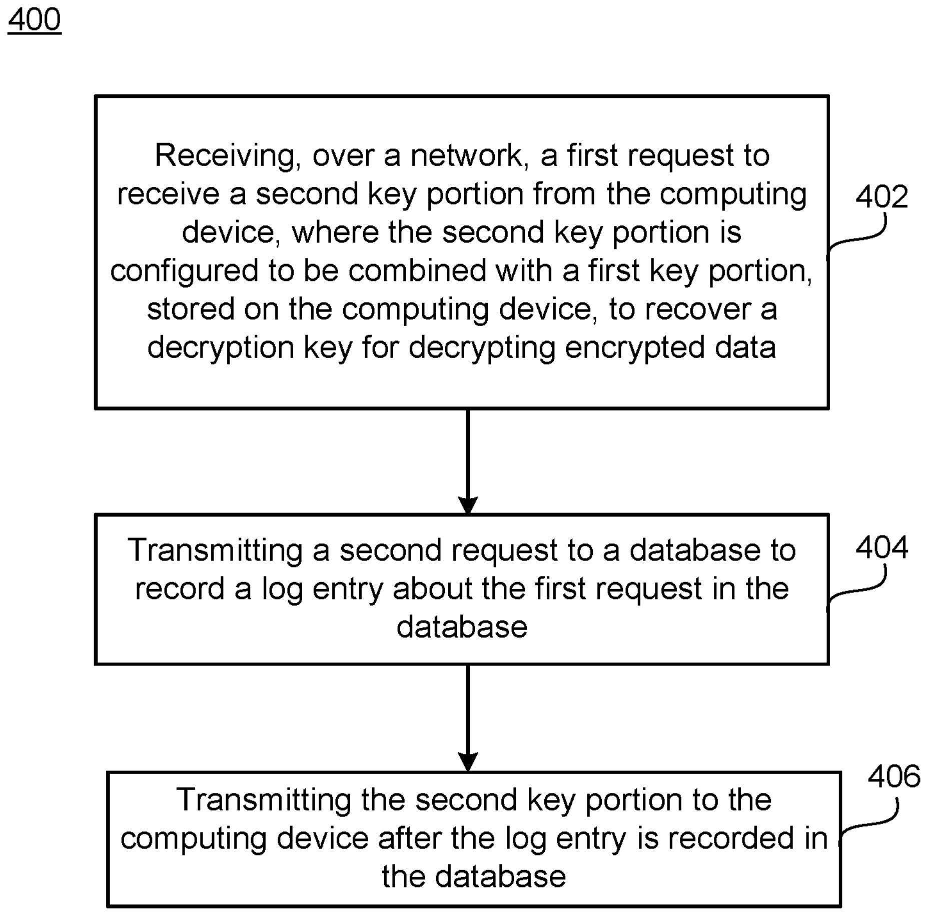
FIG. 4 illustrates a flowchart depicting example operations of a recovery system according to another aspect.

FIG. 4 illustrates a flowchart 400 depicting example operations of a recovery system according to another aspect. Although the flowchart 400 of FIG. 4 illustrates the operations in sequential order, it will be appreciated that this is merely an example, and that additional or alternative operations may be included. Further, operations of FIG. 4 and related operations may be executed in a different order than that shown, or in a parallel or overlapping fashion. Although the flowchart 400 is described with reference to the recovery system 100 of FIGS. 1A through 1C, the flowchart 400 may be executed according to any of the systems described herein including the recovery system 200 of FIG. 2.

The flowchart 400 may be executable by the recovery system 100 of FIGS. 1A to 1C. In some examples, the flowchart 400 may be executable by the recovery system 200 of FIG. 2. In some examples, the flowchart 400 depicts operations performed by the server computer 102 (e.g., the recovery service module 108). For example, when recovering data 136 that has been encrypted, the server computer 102 may perform the operations of FIG. 4. The operations of FIG. 4 may be applicable when a third party 103 is attempting to access the computing device 120 and the third party 103 has possession of the computing device 120. Also, the operations of FIG. 4 may be applicable when a user 101 has possession of the computing device 120, but the user's authentication credential for accessing the encrypted data 136*a* is not known to the user 101.

Operation 402 includes receiving, over a network 150, a first request to receive a second key portion 131 from the computing device 120, where the second key portion 131 is configured to be combined with a first key portion 130, stored on the computing device 120, to recover a decryption key 134 for decrypting encrypted data 136*a*. Operation 404 includes transmitting a second request to a database 114 to record a log entry 112 about the first request in the database 114. Operation 406 includes transmitting the second key portion 131 to the computing device 120 after the log entry 112 is recorded in the database 114. In some examples, by recording the access in the database 114, transparency may be increased, thereby protecting against insider attacks since the access may be discoverable.

Figure 5:
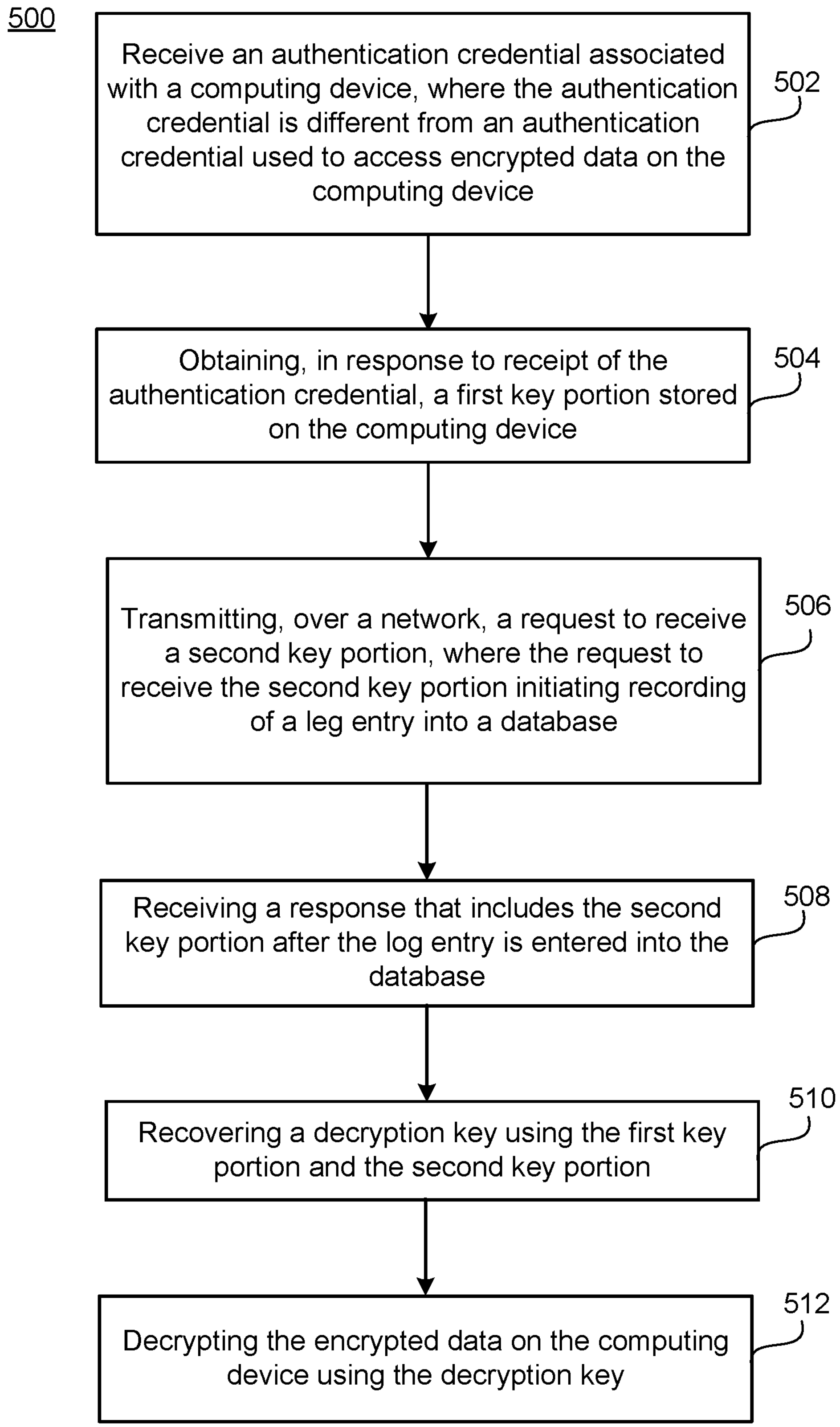
FIG. 5 illustrates a flowchart depicting example operations of a recovery system according to another aspect.

FIG. 5 illustrates a flowchart 500 depicting example operations of a recovery system according to another aspect. Although the flowchart 500 of FIG. 5 illustrates the operations in sequential order, it will be appreciated that this is merely an example, and that additional or alternative operations may be included. Further, operations of FIG. 5 and related operations may be executed in a different order than that shown, or in a parallel or overlapping fashion. Although the flowchart 500 is described with reference to the recovery system 100 of FIGS. 1A through 1C, the flowchart 500 may be executed according to any of the systems described herein including the recovery system 200 of FIG. 2.

The flowchart 500 may be executable by the recovery system 100 of FIGS. 1A to 1C. In some examples, the flowchart 500 may be executable by the recovery system 200 of FIG. 2. In some examples, the flowchart 500 depicts operations performed by the computing device 120. For example, when recovering data 136 that has been encrypted, the computing device 120 may perform the operations of FIG. 5. The operations of FIG. 5 may be applicable when a third party 103 is attempting to access the computing device 120 and the third party 103 has possession of the computing device 120. Also, the operations of FIG. 5 may be applicable when a user 101 has possession of the computing device 120, but the user's authentication credential for accessing the encrypted data 136*a* is not known to the user 101.

Operation 502 includes receiving an authentication credential 138 associated with a computing device 120, where the authentication credential 138 is different from an authentication credential used to access encrypted data 136*a* on the computing device 120. Operation 504 includes obtaining, in response to receipt of the authentication credential 138, a first key portion 130 stored on the computing device 120. Operation 506 includes transmitting, over a network 150, a request to receive a second key portion 131, where the request to receive the second key portion 131 is configured to initiate recording of a log entry 112 into a database 114. Operation 508 includes receiving a response that includes the second key portion 131 after the log entry 112 is entered into the database 114. Operation 510 includes recovering a decryption key 134 using the first key portion 130 and the second key portion 131. Operation 512 includes decrypting the encrypted data 136*a* using the decryption key 134.

Figure 6:
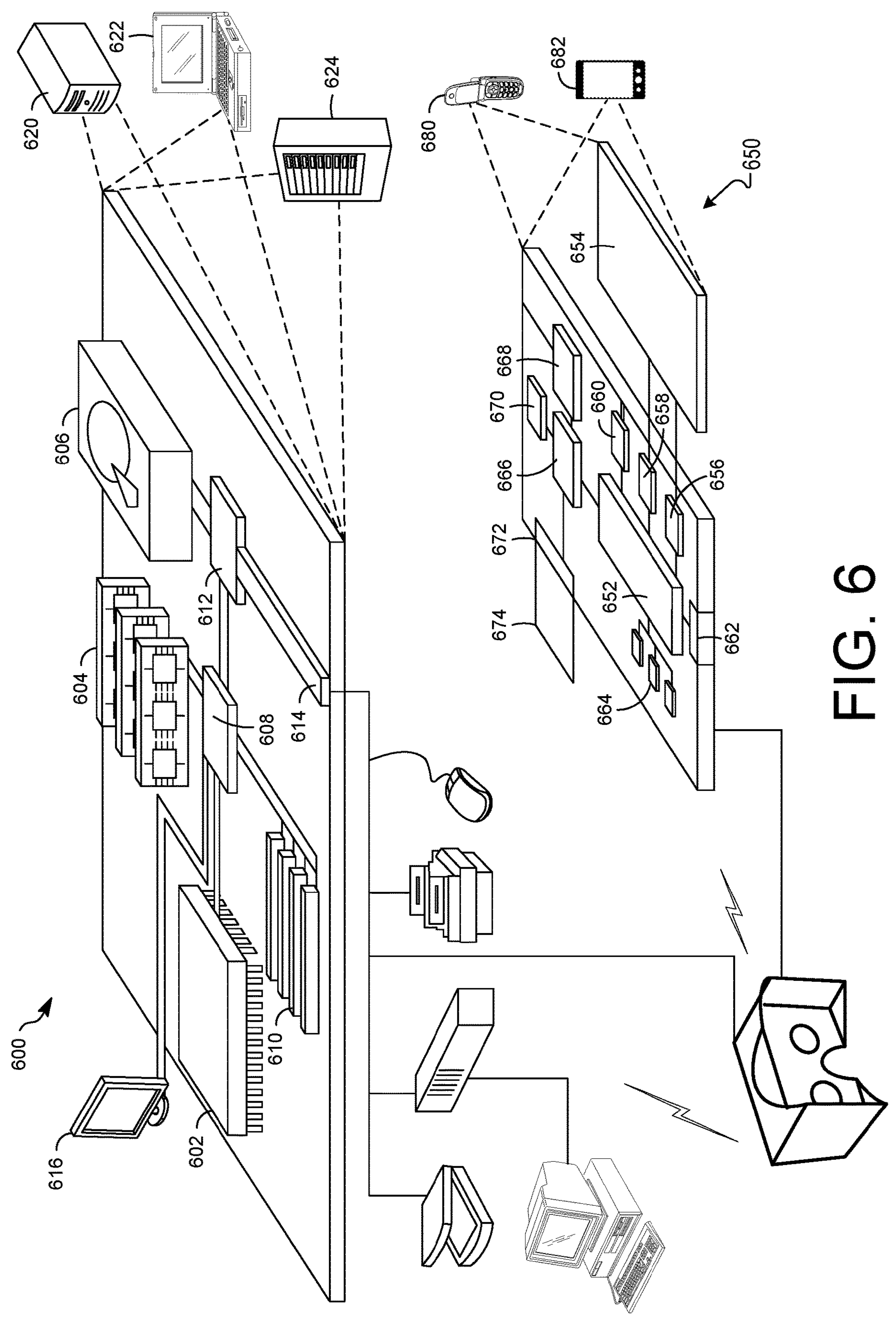
FIG. 6 is a block diagram showing example or representative computing devices and associated elements that may be used to implement the systems and methods of FIGS. 1A through 5.

FIG. 6 shows an example of a generic computer device 600 and a generic mobile computer device 650, which may be used with the techniques described here. Computing device 600 is intended to represent various forms of digital computers, such as laptops, desktops, tablets, workstations, personal digital assistants, televisions, servers, blade servers, mainframes, and other appropriate computing devices. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the subject matter described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. The processor 602 can be a semiconductor-based processor. The memory 604 can be a semiconductor-based memory. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650 or may also store applications or other information for device 650. Specifically, expansion memory 674 may include instructions to carry out or supplement the processes described above and may include secure information also. Thus, for example, expansion memory 674 may be provided as a security module for device 650 and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, which may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or another similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provided input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

It will be appreciated that the above implementations that have been described in particular detail are merely examples or possible implementations, and that there are many other combinations, additions, or alternatives that may be included.

Also, the particular naming of the components, capitalization of terms, the attributes, data structures, or any other programming or structural aspect is not mandatory or significant, and the mechanisms that implement the disclosed subject matter or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present features in terms of algorithms and symbolic representations of operations on information. These algorithmic descriptions and representations may be used by those skilled in the data processing arts to effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A method comprising:

receiving, via a user interface of a user device managed by an organization, a first authentication credential associated with an administrator of the organization, the first authentication credential being different from a second authentication credential, the second authentication credential being associated with a user assigned to the user device and used to access encrypted data on the user device;

obtaining, in response to successful authentication of the first authentication credential, a first key portion that is stored in a memory device of the user device;

transmitting, using a network, a request to receive a second key portion;

receiving, using the network, a response that includes the second key portion;

recovering a decryption key using the first key portion and the second key portion; and decrypting the encrypted data on the user device using the decryption key.

2. The method of claim 1, wherein the request to receive the second key portion initiates recording of a log entry into a database, the log entry including information about access to the user device by the administrator.

3. The method of claim 2, wherein the second key portion is received at the user device during or after the recording of the log entry into the database.

4. The method of claim 1, further comprising:

combining the first key portion and the second key portion to generate a wrapping key; and recovering the decryption key using the wrapping key.

5. The method of claim 1, further comprising:

obtaining enrollment data identifying at least one authorized user account;

determining whether the first authentication credential corresponds to the at least one authorized user account; and transmitting, in response to the first authentication credential corresponding to the at least one authorized user account, the request to receive the second key portion.

6. The method of claim 1, wherein the first key portion is stored at a crypto-processor of the user device, wherein the request to receive the second key portion is transmitted, using the network, to a security circuitry that stores the second key portion.

7. The method of claim 6, further comprising:

storing enrollment data on at least one of the crypto-processor or on the security circuitry, the enrollment data identifying an authorized user account corresponding to the first authentication credential.

8. The method of claim 1, further comprising:

receiving a successful authentication response in response to the first authentication credential being authenticated by an authentication system, wherein the first key portion is obtained in response to the successful authentication response.

9. An apparatus comprising:

at least one processor; and a non-transitory computer-readable medium storing executable instructions that cause the at least one processor to:

receive, via a user interface of a user device managed by an organization, a first authentication credential associated with an administrator of the organization, the first authentication credential being different from a second authentication credential, the second authentication credential being associated with a user assigned to the user device and used to access encrypted data on the user device;

obtain, in response to successful authentication of the first authentication credential, a first key portion that is stored in a memory device of the user device;

transmit, using a network, a request to receive a second key portion;

receive, using the network, a response that includes the second key portion;

recover a decryption key using the first key portion and the second key portion; and decrypt the encrypted data on the user device using the decryption key.

10. The apparatus of claim 9, wherein the request to receive the second key portion initiates recording of a log entry into a database, the log entry including information about access to the user device by the administrator.

11. The apparatus of claim 10, wherein the second key portion is received at the user device during or after the recording of the log entry into the database.

12. The apparatus of claim 9, wherein the executable instructions include instructions that cause the at least one processor to:

combine the first key portion and the second key portion to generate a wrapping key; and recover the decryption key using the wrapping key.

13. The apparatus of claim 9, wherein the executable instructions include instructions that cause the at least one processor to:

obtain enrollment data identifying at least one authorized user account;

determine whether the first authentication credential corresponds to the at least one authorized user account; and transmit, in response to the first authentication credential corresponding to the at least one authorized user account, the request to receive the second key portion.

14. The apparatus of claim 9, wherein the first key portion is stored at a crypto-processor of the user device, wherein the request to receive the second key portion is transmitted, using the network, to a security circuitry configured to store the second key portion.

15. The apparatus of claim 14, wherein the executable instructions include instructions that cause the at least one processor to:

store enrollment data on at least one of the crypto-processor or on the security circuitry, the enrollment data identifying an authorized user account corresponding to the first authentication credential.

16. The apparatus of claim 9, wherein the executable instructions include instructions that cause the at least one processor to:

receive a successful authentication response in response to the first authentication credential being authenticated by an authentication system, wherein the first key portion is obtained in response to the successful authentication response.

17. A non-transitory computer-readable medium storing executable instructions that cause at least one processor to execute operations, the operations comprising:

receiving, via a user interface of a user device managed by an organization, a first authentication credential associated with an administrator of the organization, the first authentication credential being different from a second authentication credential, the second authentication credential being associated with a user assigned to the user device and used to access encrypted data on the user device;

obtaining, in response to successful authentication of the first authentication credential, a first key portion that is stored in a memory device of the user device;

transmitting, using a network, a request to receive a second key portion;

receiving, using the network, a response that includes the second key portion;

recovering a decryption key using the first key portion and the second key portion; and decrypting the encrypted data on the user device using the decryption key.

18. The non-transitory computer-readable medium of claim 17, wherein the request to receive the second key portion initiates recording of a log entry into a database, the log entry including information about access to the user device by the administrator.

19. The non-transitory computer-readable medium of claim 18, wherein the second key portion is received at the user device during or after the recording of the log entry into the database.

20. The non-transitory computer-readable medium of claim 17, wherein the operations further comprise:

combining the first key portion and the second key portion to generate a wrapping key; and recovering the decryption key using the wrapping key.

* * * * *